United States Patent [19]
Satzler et al.

[11] 3,750,263
[45] Aug. 7, 1973

[54] METHOD FOR PRODUCING AN ASSEMBLY BY FRICTION WELDING

[75] Inventors: Ronald L. Satzler, Metamora; Marion R. Calton, East Peoria, both of Ill.

[73] Assignee: Caterpillar Tractor Co., Peoria, Ill.

[22] Filed: June 1, 1971

[21] Appl. No.: 148,780

[52] U.S. Cl.............. 29/470.3, 29/159.2, 156/73, 228/3
[51] Int. Cl............................................ B23k 27/00
[58] Field of Search.................... 29/470.3, 159.2; 228/2; 156/23

[56] References Cited
UNITED STATES PATENTS
3,626,779  12/1971  Howard ............................ 29/159.2
3,477,115  11/1969  Martin et al. ...................... 29/470.3

Primary Examiner—J. Spencer Overholser
Assistant Examiner—Robert J. Craig
Attorney—Fryer, Tjensvold, Feix, Phillips & Lempio

[57] ABSTRACT

Cluster gear assemblies are produced by a method and apparatus which join a plurality of pre-machined gears by a common joining member. The plurality of gears are held in relative nonrotative relationship by special holding means which further establish precise angular and axial alignment between the gears and axial alignment between the joining member and the gears. Joining of the various members to produce the assembly is accomplished by friction welding.

5 Claims, 7 Drawing Figures

INVENTORS
RONALD L. SATZLER
MARION R. CALTON

METHOD FOR PRODUCING AN ASSEMBLY BY FRICTION WELDING

BACKGROUND OF THE INVENTION

Friction welding is a well-known method of joining individual pieces into an assembly. However, this method has been limited in the past to joining pieces which required no specific angular alignment between the individual pieces of the conpleted assembly, since it is extremely difficult to stop a rotating piece in an exact position. Because of this porblem, most assemblies which require angular alignment between individual pieces are not joined by friction welding. Many such assemblies are produced by machining the entire assembly from one original piece. One example of this type of assembly is a cluster gear.

Cluster gear assemblies form a necessary portion of most transmission units, although they are expensive to produce and add bulk and weight to a unit. Present technology for manufacturing cluster gears utilizes a forging process whereby a gear blank is forged from a single slug of metal. The gear teeth are not formed on the forging but are machined in subsequent machining operations. Much of the expense of producing cluster gear assemblies relates to the time-consuming method of machining teeth on adjacent gears specifically where those gears necessarily have different outside diameters. The teeth on the largest gear in the cluster can be machined by a fast and economical hobbing operation. However, the teeth on the smaller gears in the cluster usually must be machined by slow and expensive shaping and shaving operations. The extra bulk and weight are the result of providing clearance between the adjacent gears to accommodate various types of cutting tools for machining the gear teeth.

SUMMARY AND OBJECTS OF THIS INVENTION

Briefly described, this invention relates to a method of producing an improved cluster gear assembly. To produce this assembly, special holding means are provided to hold a plurality of individual premachined gear members in an exact angular and axial position while a joining member is simultaneously friction welded to each of the gear members. Friction welding of the conventional or the inertia type may be used. It is, therefore, an object of this invention to overcome the above briefly-described problems by providing methods and apparatus for joining a plurality of individual parts into an assembly.

It is also an object of this invention to join a plurality of members which require angular alignment by a method in which no relative motion between the plurality of members is permitted.

It is another object of the invention to join a plurality of individual finished, or semifinished, gears into a cluster unit.

It is a further object of this invention to construct an improved cluster gear assembly which is lighter in weight and less costly to produce than known cluster gear assemblies.

A still further object of this invention is an apparatus which will hold members to be joined in an exact angular and axial position.

It is also an object of the invention to form a cluster gear assembly by joining the parts of the assembly by the friction or inertia welding processes.

These and other objects of the invention will become apparent to those skilled in the art upon examination of the following description of the preferred embodiments thereof as depicted in the drawings, which are intended to illustrate but not restrict the scope of this invention. It is recognized that other embodiments of the invention may be used and structural changes may be made by those skilled in the art without departing from the scope of the present invention and the purview of the appended claims.

DESCRIPTION OF THE PREFERRED EMBODIMENT

Figure 1:
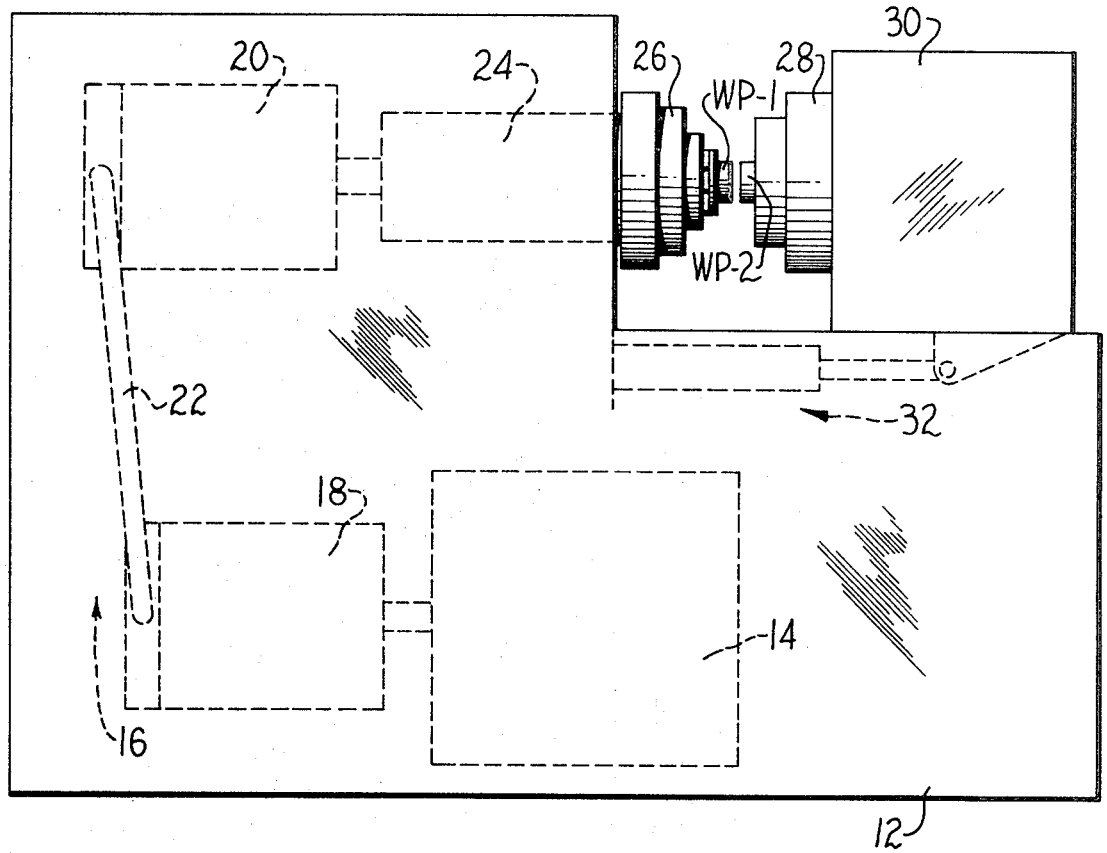
FIG. 1 is a side elevation illustrating one embodiment of a friction welding machine which may be used to practice the method of the present invention.

A friction welding machine, constructed in accordance with one exemplary embodiment of the present invention is indicated generally by the reference number 10 in FIG. 1 of the drawings. As illustrated, the friction welding machine 10 comprises a frame or housing structure 12 for housing the various components of the machine. Within the housing of the machine, an electric motor 14 powers a hydrostatic transmission generally denoted by reference numberal 16. The hydrostatic transmission 16 includes a hydraulic pump 18 and a hydraulic motor 20, operably connected by a manifold or conduits 22. The hydraulic motor 20 is connected to a spindle assembly 24 which is mounted for rotation within the machine frame 12.

A rotary holding fixture 26 is mounted on the spindle assembly 24 and rotates with the spindle. An exemplary workpiece WP-1 is securely held within the rotary fixture 26.

A second workpiece WP-2 is securely held in a non-rotary fixture 28 attached to a tailstock fixture 30 which is mounted on the frame 12.

The tailstock fixture 30 is mounted for axial movement on the machine frame by a load cylinder assembly 32.

A pressure control circuit, not shown, regulates the pressure in the load cylinder and thus determines the force with which the parts WP-1 and WP-2 are engaged.

The hydrostatic transmission assembly 16 can be used to vary the drive ratio between the motor and the spindle assembly 24 and can also be used to effectively disconnect the spindle assembly from the motor. Various other means could also be used to disconnect the spindle from the motor, including many types of available clutches.

It is to be understood that flywheel weights, although not shown, could be mounted to the rotary holding fixture 26 so that the welding machine 10 can be operated as an inertia welding machine, as described in U.S. Pat. No. 3,273,233, and as further described in detail below. It is also to be understood that the workpieces WP-1 and WP-2 shown in FIG. 1 are exemplary only and do not necessarily represent the exact configuration of the workpieces to be welded within the scope of this invention. A more detailed description of several workpiece configurations will be given with reference to FIGS. 2, 3, 4 and 5 in the drawings.

With continued reference to FIG. 1, a welding operation for joining two workpieces WP-1 and WP-2 together is performed by operating the machine in the following general manner:

One of the workpieces, WP-1, is secured within the rotatable holding fixture 26 on the spindle assembly 24. The other workpiece, WP-2, is secured within the nonrotatable holding fixture 28 which is further fastened to the tailstock assembly 30. The load cylinder 32 is then activated to move the tailstock assembly 30 toward the spindle 24 until the workpieces WP-1 and WP-2 are in close proximity, but are not in contact with each other. The motor 14 is then activated and the spindle assembly 24 and rotatable holding fixture 26 are accelerated by means of the hydrostatic transmission assembly 16 which is coupled to the electric motor 14.

When the predetermined and preset velocity is reached by the rotating fixture 26, appropriate controls shut down or disconnect the electric motor 14 from the spindle assembly 24, and at the same time activate the load cylinder 32 to move the tailstock fixture 30 forward. Workpiece WP-2 is thereby brought into contact under pressure with the rapidly rotating workpiece WP-1, and heat is generated by friction at the contacting surfaces of the two workpieces. This heating continues until the workpieces reach the weld temperature at which time the upsetting pressure, applied by the load cylinder 32 at a constant or varying pressure, causes flashing or upsetting to occur. During this period of heating and flashing, the rotational velocity of the spindle and holding fixture has continued to decrease.

At the time that rotation ceases, all of the stored energy in the rotating members has been converted to heat and forging at the weld interface and the weld is completed. The load cylinder 32 is then activated in a reverse direction and the complete welded assembly is removed from the holding fixtures of the machine. Although ths inertia welding process has been described, it is recognized that other methods of friction welding may be used to practice the instant invention.

Figure 2:
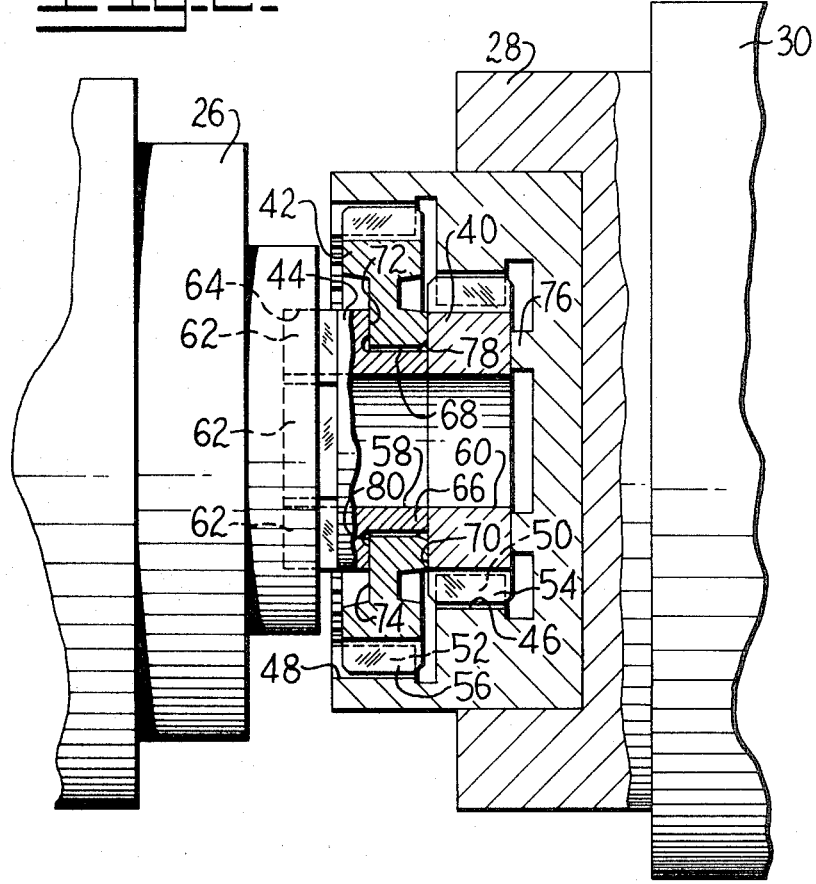
FIG. 2 is a fragmentary side view, partially in section, illustrating workpiece holding fixture parts and apparatus constructed in accordance with one embodiment of the invention.

FIG. 2 illustrates one embodiment of the present invention consisting of a welded cluster gear assembly. The cluster gear assembly consists of a first premachined gear 40, a second premachined gear 42, and a rotatable joining member 44 which serves to join all members together into as assembly.

The two gears 40 and 42 are held together in a special nonrotatable fixture 28.

The rotatable joining member 44 is held in a special rotatable holding fixture 26.

Fixture 28 is in turn securely fastened to the tailstock portion 30 of a welding machine.

Fixture 26 is securely fastened to the rotatable spindle of a friction welding machine (refer to FIG. 1).

At this point, it should be stated that it would be possible, and in some instances desirable, to rotate the gears 40 and 42, by rotating fixture 28 and hold the joining member 44 against rotation. The only requirement is that relative rotary motion be imparted between the plurality of members (gears, in this case) and the joining member.

Fixture 28 contains two counterbores 46 and 48 with internal teeth 50 and 52 machined in the respective counterbores. Internal teeth 50 are machined to match and mesh with the external teeth 54 of gear 40, and internal teeth 52 are machined to match and mesh with external teeth 56 on gear 42. In this way, both gears 40 and 42 are prevented from rotating and any angular alignment between the two gears can be obtained by machining the internal teeth in the fixture 28 to produce the desired alignment. Axial alignment between gears 40 and 42 is also attained by proper machining of the counterbores and internal teeth of fixture 28.

The joining member 44 is essentially a tubular member with an internal bore 58 which closely matches the bore 60 of gear 40.

The member 44 further contains a plurality of flats 62, which together form a hexagonal shape and fit into a matching socket 64 of the holding fixture 26. In this way, the joining member 44 is securely held within the fixture 26 without the necessity of tightening any type of collect or jaws.

Although the joining member and fixture socket have been indicated as having a hexagonal configuration, any number of other types of configurations would work equally satisfactorily, such as square or octagonal. The end of the joining member opposite the hexagonal portion is of reduced diameter and contains a circular projection 66 which is slightly smaller in diameter than the internal bore 68 of gear 42. In this way, the projection 66 extends through the bore 68 and contacts surface 70 of gear 40 without making contact with the internal bore 68 of gear 42. The length of projection 66 is such that when it is inserted into bore 68 of gear 42, the end of the projection will contact surface 70 at or about the same time that contact is made between surface 72 of the joining member and surface 74 of gear 42.

At the beginning of a welding operation to join the two gears and the joining member into a cluster gear assembly, a small gap exists between the projection 66 and surface 70 as well as between surfaces 72 and 74. In this way, the joining member can be accelerated to the welding speed without friction developing due to contacting surfaces. However, once the welding velocity has been reached, the load cylinder is activated to bring the rotating joining member into contact with both nonrotating gears 40 and 42. A weld is thereby accomplished between projection 66 of the joining member and the surface 70 of gear 40, and between surface 72 of the joining member and surface 74 of the gear 42. Although no actual weld exists between the two gears 40 and 42, they are rigidly joined by the member 44 since a separate area of the joining member 44 is welded to each of the gears 40 and 42.

During the application of the welding thrust force, gear 40 is supported by a projection 76 within fixture 28, and gear 42 is supported against the thrust by the gear 40.

A camber 78 on gear 42 forms a flash trap to accommodate the external flash produced between the joining member 44 and gear 40.

Likewise, a machined groove 80 in the joining member 44 accommodates the internal flash produced between member 44 and gear 42.

The external flash produced when surface 72 of member 44 is welded to surface 74 of gear 42, can remain on the gear assembly since it is in an area which will cause no problems. However, the internal flash produced between member 44 and gear 40, which will flow into the bores 58 and 60, will need to be removed since these bores must accommodate a shaft. This flash removal will present no problem since these bores must be finish machined prior to final assembly of the cluster gear unit into a transmission.

Figure 3:
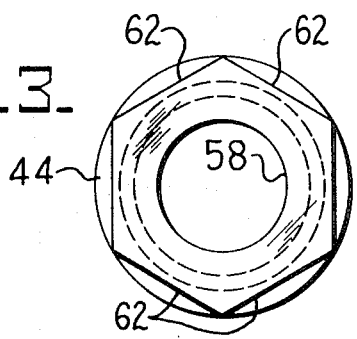
FIG. 3 is a top plan view of the joining member of FIG. 2.

FIG. 3 illustrates a top plan view of the joining member shown in FIG. 2. As previously mentioned, the joining member 44 is provided with a hexagonal shape by flats 62 for easy insertion into and removal from the rotatable holding fixture 26. The hexagonal portion 62 in cooperation with socket 64 provides a positive driving connection between the joining member 44 and fixture 26 during acceleration and to absorb the torque developed during the friction welding operation.

Alternatively, joining member 44 could be held in any suitable manual or power-operated chucking device to eliminate the necessity of producing a noncircular shape at the one end of the joining member.

Since the teeth of the two gears 40 and 42 are machined prior to welding, no extra space is required between the gears to accommodate machining tools, as is required in the production of most cluster gear assemblies. This advantageously results in a high-strength, compact, lightweight assembly as compared with cluster gear assemblies produced by other methods. The total cost of producing a cluster gear assembly by the instant invention is also less than other known methods since less costly machining operations can be used to machine the gears before welding.

Figure 4:
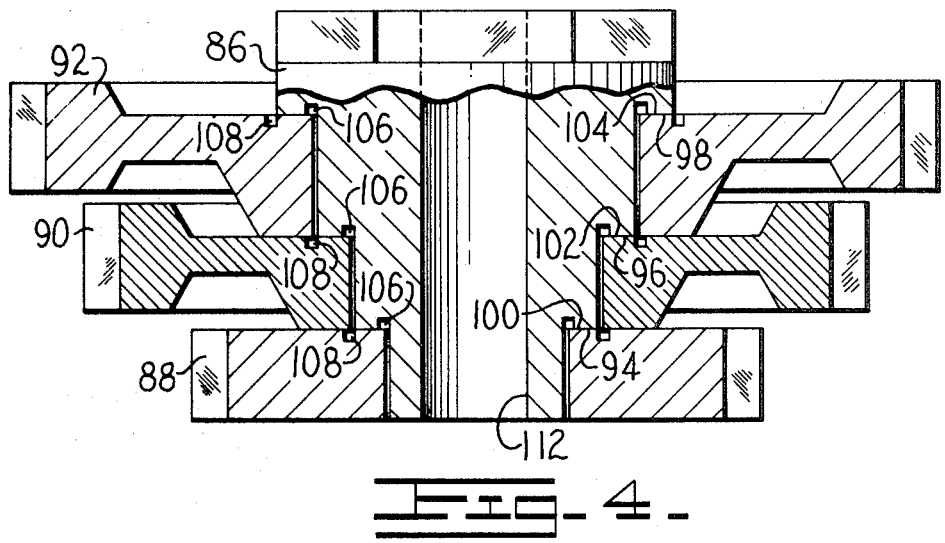
FIG. 4 is a cross-sectional view of a gear assembly joined in accordance with another embodiment of the invention.

Referring to FIG. 4 of the drawings, a slightly different embodiment of the invention is illustrated. In this embodiment, a joining member 86 is used to join three separate gear members 88, 90 and 92 into a cluster assembly. In this assembly three surfaces 94, 96, and 98 of the joining member are welded to respective surfaces 100, 102, and 104 of gears 88, 90, and 92.

Small pockets 106 in the joining member and grooves 108 in gears 88, 90, and 92 cooperate to form flash traps for the flash produced during the welding.

Any required angular alignment between gears 88, 90, and 92, can, of course, be provided by a special holding fixture, similar to fixture 28 in FIG. 2. Axial alignment between all members of the assembly is provided by the two fixtures holding the rotary and non-rotary members. A central bore 112 in the joining member 86 can provide for the mounting of the completed assembly on a shaft.

Figure 5:
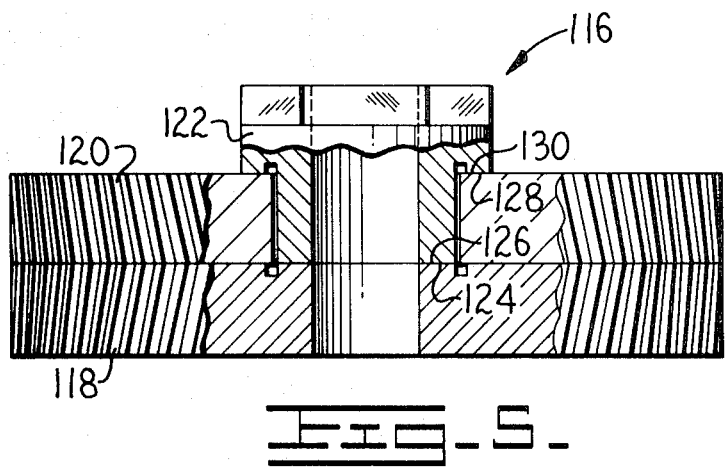
FIG. 5 is a cross-sectional view of another gear assembly joined in accordance with one embodiment of the invention.

FIG. 5 illustrates an alternate assembly joined in accordance with the embodiment shown and described in reference to FIG. 2. However, the completed assembly of FIG. 5 comprises a herringbone gear rather than a cluster assembly. The herringbone gear assembly 116 consists of two helical gears 118 and 120 and a joining member 122. In this assembly, surface 124 of joining member 122 is welded to surface 126 of gear 118 and surface 128 of member 122 is welded to surface 130 of gear 120.

The herringbone gear is a very special type of gear and is extremely expensive to produce using present manufacturing technology. However, by joining two premachined helical gears, one left hand and one right hand, using the methods and apparatus of the present invenlion, an inexpensive herringbone gear is produced.

Figure 6:
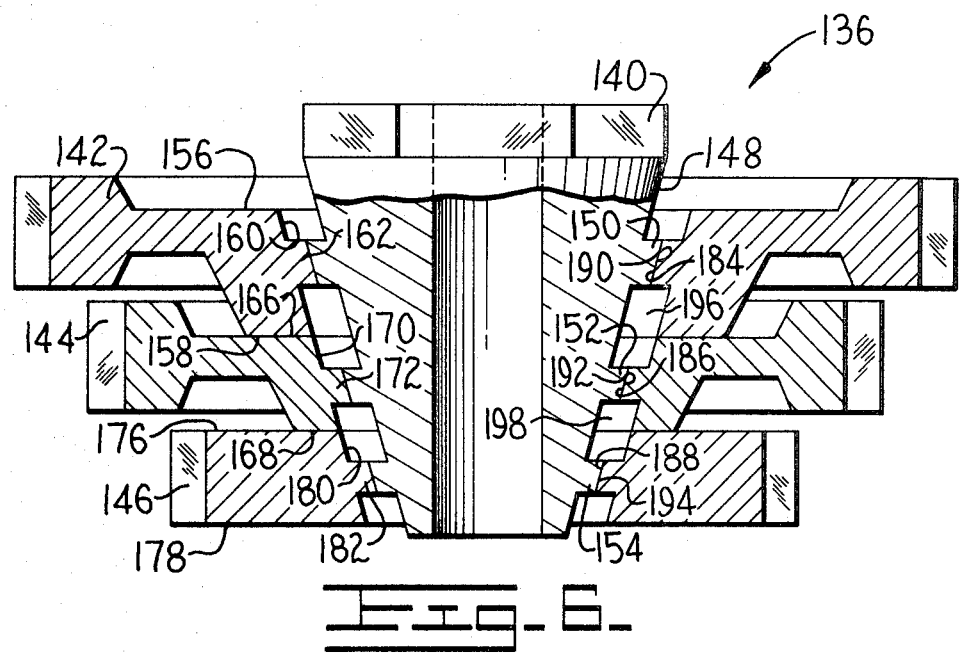
FIG. 6 is a cross-sectional view of a gear assembly joined in accordance with still another embodiment of the invention.
Figure 7:
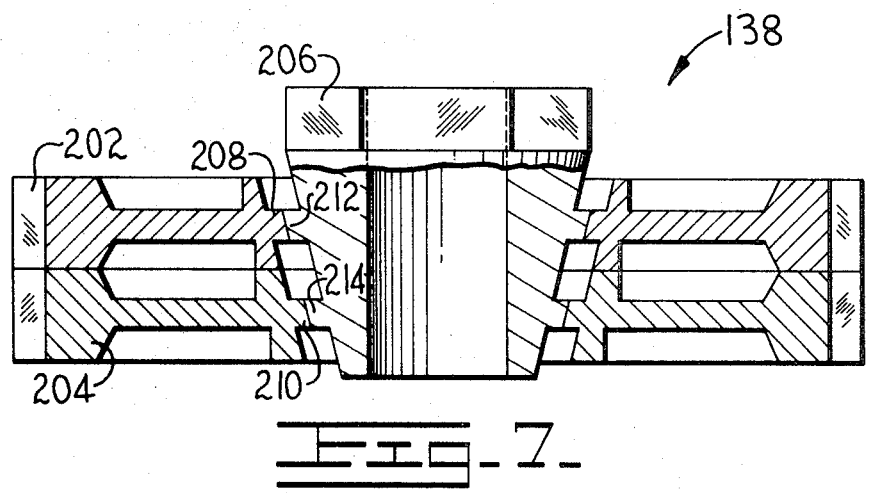
FIG. 7 is a cross-sectional view of another gear assembly joined in accordance with one embodiment of the invention.

FIGS. 6 and 7 illustrate alternate designs, respectively, of a cluster gear assembly 136 and a herringbone gear assembly 138 produced in accordance with the present invention. Assembly 136 comprises a joining member 140 and three gear-like members, 142, 144 and 146. An outer conical-shaped surface 148 of the joining member 140 contains a plurality of longitudinally spaced parallel projections 150, 152 and 154, which extend radially outward.

Member 142 contains two radially extending parallel end surfaces 156 and 158, a central tapered bore 160, and a projection 162 extending radially inward from the central bore. Member 144 also contains two radially extending parallel end surfaces 166 and 168, a central tapered bore 170, and a projection 172 extending radially inward from the central bore. Likewise, member 146 contains two radially extending parallel end surfaces 176 and 178, a central tapered bore 180 and a projection 182 extending radially inward from the central bore.

The three projections 162, 172 and 182 contain respectively tapered surfaces 184, 186 and 188 which match tapered surfaces 190, 192 and 194, respectively, of joining member projections 150, 152, and 154. The joining members 140 and the three gear members 142, 144, and 146 are welded into assembly 136 by the previously described method wherein the three gear members are held in a non-rotating fixture (not shown) and the joining member is held in the rotatable fixture of a friction welding machine (not shown).

A special non-rotating holding fixture will secure the three gear members 142, 144 and 146 in whatever angular alignment is desired. Once secured in the fixture, surface 158 of member 142 is in contact with surface 166 of member 144 and surface 168 of member 144 is in contact with surface 176 of member 146. Actual welding between the joining member and the other members takes place at the contact areas between tapered surfaces 184, 186 and 188 of the gear members and matching tapered surfaces 190, 192 and 194 of the joining member.

In the completed assembly, two sealed pockets 196 and 198 are formed between joining member and the other members. Much of the flash produced during welding will be contained within these pockets and will, of course, need not be removed. Likewise, the flash at the other weld areas, which is not sealed within pockets 196 and 198, is in a recessed area and will, most likely, not require removal.

FIG. 7 illustrates the design of FIG. 6 adapted to a herringbone gear assembly 138. In this embodiment, a left hand helical gear member 202 and a right hand helical gear member 204 are held in a non-rotatable fixture (not shown) while a joining member 206, held in the rotatable portion of a friction welding machine (not shown) is welded to the two gear members. As in the embodiment of FIG. 6, welding takes place between matching tapered surfaces on projections 208 and 210 of members 202 and 204 and projections 212 and 214 of joining member 206.

While the subject invention has been illustrated and described with particular reference to cluster gear assemblies, it is to be understood that other types of assemblies could be joined by using the disclosed method and apparatus. Therefore, we do not wish to be limited to the precise details set forth, but desire to avail ourselves of such changes and alternations which fall within the purview of the following claims.

What is claimed is:

1. A method of joining a plurality of members comprising the steps of:
   a. Locating a first joining member in a first workpiece holding means;
   b. Locating at least second and third premachined gear members in relative nonrotative relationship and precise axial alignment in a second workpiece holding means;
   c. Interlocking internal peripheral elements of the holding means with external peripheral gear teeth of the second and third gear members to maintain the second and third gear members in a fixed angular position with respect to each other;
   d. Each of said second an third gear members having an annular surface exposed for contact with a surface on the first member;
   e. Positioning one of said workpiece holding means relative to the other workpiece holding means such that said first member is located in a predetermined axial position and in juxtaposed relationship to said at least second and third members; and
   f. Friction welding said first member to said second and third members to form a cluster gear assembly.

2. A method as set forth in claim 1 wherein the said second and third members are premachined helical gears and said assembly is a herringbone gear assembly.

3. A method as set forth in claim 1 wherein the said friction welding comprises at least two separate weld areas disposed in different planes and the welds are accomplished simultaneously.

4. A method as set forth in claim 3 wherein said friction welding is of the inertia type in which the energy necessary to accomplish the welding is stored in rotating flywheels.

5. A method as set forth in claim 1 wherein said first joining member and one of said second and third gear members have bores extending therethrough which are coaxially arranged to form an axial passage through the gear assembly, an annular bond being formed between said first joining member and said one of said second and third gear members adjacent the axial bore formed through the gear assembly.

* * * * *